UNITED STATES PATENT OFFICE.

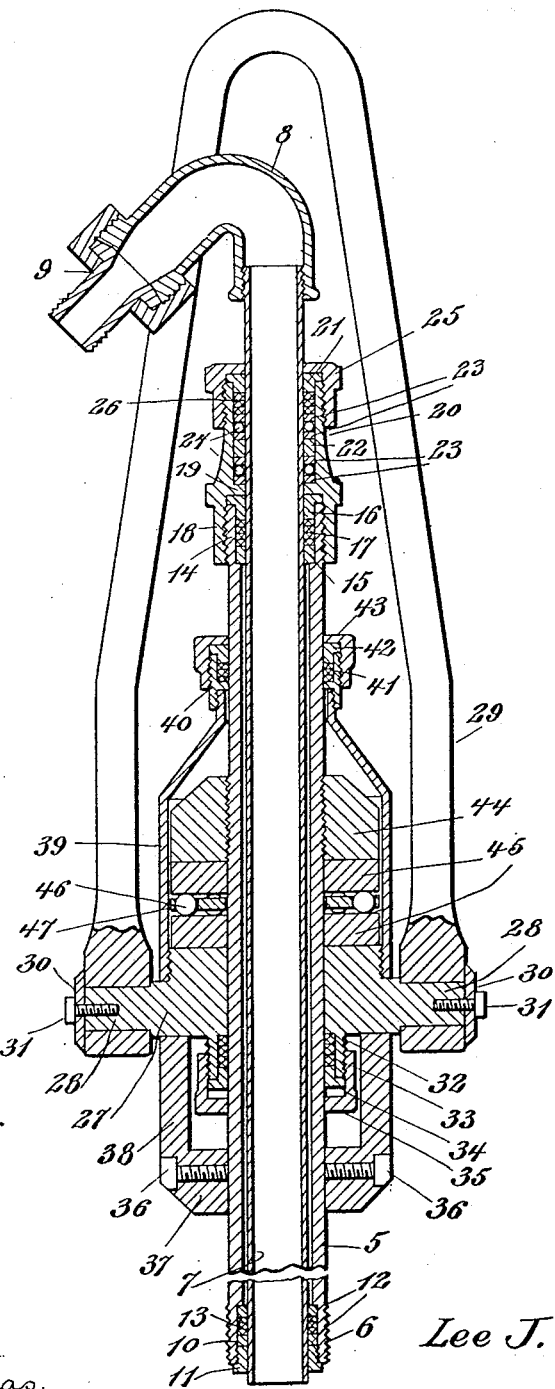

LEE J. BLACK, OF BEAUMONT, TEXAS.

HYDRAULIC SWIVEL.

1,119,774.  Specification of Letters Patent.  Patented Dec. 1, 1914.

Application filed December 5, 1913. Serial No. 804,955.

*To all whom it may concern:*

Be it known that I, LEE J. BLACK, a citizen of the United States, residing at Beaumont, in the county of Jefferson and State of Texas, have invented certain new and useful Improvements in Hydraulic Swivels, of which the following is a specification.

This invention relates to devices known as hydraulic swivels which are designed for use in connection with rotary well-drilling machines, to permit the flow of water to the point of the drill.

It is the object of the present invention to provide a novel and improved structure which permits perfect lubrication of the movable parts of the device, and also prevents access of grit, mud and other foreign substances to said parts.

This object is attained by means of a combination and arrangement of parts to be hereinafter described and claimed, reference being had to the accompanying drawing in which a central vertical section of the device is shown.

Referring specifically to the drawing, 5 denotes the usual tubular swivel stem which is screw-threaded at its lower end, as indicated at 6, for connection to the rotary drill-tube or casing. Through this stem loosely extends the wash-pipe 7 having connected to its upper end the goose-neck 8 carrying a suitable coupling 9 for connection to the supply-hose.

The lower end of the swivel stem 5 is formed with a stuffing box 10, closed by a gland 11, which latter is screwed into the stuffing box. A pair of spaced junk rings 12 confine a packing 13 in the stuffing box. Thus, a liquid-tight joint is made between the lower end of the wash-pipe 7 and the corresponding end of the swivel stem.

The upper end of the swivel stem 5 has a stuffing box 14 containing a bottom junk ring 15, a gland 16 and a packing 17 therebetween. On the upper end of the swivel stem is screwed a bonnet 18 having an internal shoulder 19 which engages the gland 16 and holds the same in place. The wash-pipe 7 passes through the bonnet, and the latter has a stuffing box 20 at its upper end which is provided with a gland 21. On that portion of the wash-pipe which is in the stuffing box 20 is made fast a collar 22, and above and below this collar are race-rings 23 between each set of which are located antifriction balls 24. On the upper end of the stuffing box 20 is screwed a cap 25 to hold the gland 21 in place, and between said gland and the top race-ring is a packing 26.

To the swivel stem 5, intermediate the ends thereof, is applied a cross-head 27 having diametrically opposite trunnions 28 for connection of the bail 29, the latter being held on the trunnions by washers 30 and screws 31. The bottom of the cross-head has a stuffing box 32 through which the swivel stem passes, said stuffing box containing a packing 33 and a gland 34 held in place by a cap 35.

To the swivel stem 5, below the stuffing box 32, is secured, by countersunk set screws 36, a set collar or abutment 37 having a top sleeve-extension 38 which abuts against the bottom of the cross-head 27, and surrounds the stuffing box 32.

To the top of the cross-head 27, is screwed or otherwise fastened a housing 39 which rises from the cross-head and has a reduced upper end through which the swivel stem 5 passes. The upper end of the housing also carries a stuffing box 40 surrounding the swivel stem, and provided with a packing 41, a gland 42 and a cap 43. The housing 39 incloses a bearing collar 44 which is screwed or otherwise made fast to the swivel stem 5. The bearing collar is spaced from the top of the cross-head 27 a sufficient distance to accommodate a pair of race-rings 45 encircling the swivel stem. Two concentric annular series of antifriction balls 46 are interposed between the race-rings, the same being provided with a spacing ring 47. The cross-head 27 is held against longitudinal movement on the swivel stem 5 by the collars 37 and 44, a ball bearing as shown and described being interposed between the collar 44 and the top of the cross-head.

The purpose of the stuffing boxes 32 and 40, and the housing 39, is to form an oil-tight compartment in which the rotating parts run, thereby rendering possible perfect lubrication of said parts, and also excluding therefrom dust, dirt, grit and other foreign substances, which is important in order to prevent undue wear and friction. The oil is free to circulate around the race-rings 45 and the balls 46 therebetween, and also along the outside of the swivel stem 5 and down through the cross-head 27, which latter is stationary. The sleeve-extension 38 is designed to protect the stuffing box 32, and also to hold the cross-head firmly against its top bearing composed of the collar 44 and the ball bearing between the latter and the top of the cross-head, the collar being fast on the swivel stem and supporting the entire load.

I claim:

1. In a hydraulic swivel, the combination of a swivel stem, a cross-head through which the swivel stem passes, a stuffing box on the bottom of the cross-head and surrounding the swivel stem, and abutment on the swivel stem below the stuffing box, said abutment having a sleeve extension surrounding the stuffing box and abutting against the bottom of the cross-head.

2. In a hydraulic swivel, the combination of a swivel stem, a cross-head through which the swivel stem passes, a stuffing box on the bottom of the cross-head and surrounding the swivel stem, and a housing carried by the swivel stem below the cross-head, said housing surrounding the stuffing box.

3. In a hydraulic swivel, the combination of a swivel stem, a cross-head through which the swivel stem passes, a top bearing for the cross-head carried by the swivel stem, a housing connected to and rising from the top of the cross-head and surrounding the top bearing, stuffing boxes on the upper end of the housing and on the bottom of the cross-head, through which stuffing boxes the swivel stem passes, and a housing carried by the swivel stem below the cross-head, said housing surrounding the stuffing box on the bottom of the cross-head.

4. In a hydraulic swivel, the combination of a swivel stem, a cross-head through which the swivel stem passes, a top bearing for the cross-head carried by the swivel stem, a housing connected to and rising from the top of the cross-head and surrounding the top bearing, stuffing boxes on the upper end of the housing and on the bottom of the cross-head, through which stuffing boxes the swivel stem passes, and an abutment on the swivel stem below the second-mentioned stuffing box, said abutment having a sleeve extension surrounding said stuffing box and abutting against the bottom of the cross-head.

5. In a hydraulic swivel, the combination of a swivel stem, a cross-head through which the swivel stem passes, a top bearing for the cross-head adjustably mounted on the swivel stem, a housing connected to and rising from the top of the cross-head and surrounding the top bearing, and a stuffing box on the upper end of the housing through which the swivel stem passes.

In testimony whereof I affix my signature in presence of two witnesses.

LEE J. BLACK.

Witnesses:
C. TIM WILL,
W. G. ALLEN.

Copies of this patent may be obtained for five cents each, by addressing the "Commissioner of Patents, Washington, D. C."